US012652307B1

(12) United States Patent
Baghdadi et al.

(10) Patent No.: US 12,652,307 B1
(45) Date of Patent: Jun. 9, 2026

(54) AUTOMATED SYSTEM TO ASSESS NETWORK SYSTEMS SECURITY, EXPLOIT VULNERABILITIES, AND PROVIDE SECURITY RECOMMENDATIONS

(71) Applicant: Cybral IP LLC, Golden, CO (US)

(72) Inventors: Amr Ali Baghdadi, Dubai (AE); Nour Shawky, Cairo (EG); Mohamed Hamed Abdalla Hammad, Alexandria (EG); Doaa Mohamed Yassein Hefnawy, Cairo (EG)

( * ) Notice: Subject to any disclaimer, the term of this patent is extended or adjusted under 35 U.S.C. 154(b) by 499 days.

(21) Appl. No.: 18/100,939

(22) Filed: Jan. 24, 2023

(51) Int. Cl.
| | |
|---|---|
| *G06F 11/00* | (2006.01) |
| *G06F 12/14* | (2006.01) |
| *G06F 12/16* | (2006.01) |
| *G06N 3/092* | (2023.01) |
| *G08B 23/00* | (2006.01) |
| *H04L 9/40* | (2022.01) |

(52) U.S. Cl.
CPC ......... *H04L 63/1433* (2013.01); *G06N 3/092* (2023.01); *H04L 63/1425* (2013.01)

(58) Field of Classification Search
CPC .. H04L 63/1433; H04L 63/1425; G06N 3/092
USPC .......................................................... 726/25
See application file for complete search history.

(56) References Cited

U.S. PATENT DOCUMENTS

| | | | | |
|---|---|---|---|---|
| 2019/0258807 A1* | 8/2019 | DiMaggio | ............. | G06F 21/577 |
| 2020/0097602 A1* | 3/2020 | Ristoski | ................. | G06N 5/022 |
| 2020/0389377 A1* | 12/2020 | Dienelt | ................... | H04L 41/14 |
| 2021/0034602 A1* | 2/2021 | Levacher | ............ | G06F 16/2365 |
| 2021/0352095 A1* | 11/2021 | Cam | ...................... | G06N 20/00 |

* cited by examiner

*Primary Examiner* — Jeffrey C Pwu
*Assistant Examiner* — Samuel Ambaye
(74) *Attorney, Agent, or Firm* — Reilly Intellectual Property Law Firm

(57) ABSTRACT

A network system to use artificial intelligence to provide an automated system to identify security vulnerability exploitation paths, predict next targets, and provide recommendations. The system provides a centralized system to provide an automated system to perform each primary function of red-teaming activities and penetration testing. The system provides the following actions to test the system: automated attack surface discovery; automation of penetration testing either internal or external; automation of different cloud security scanning; and automation of network and web scanning. To accomplish these steps, the system analyzes information gathered related to a client security posture and recommends required assessments, automates the implementation of the security assessments to identify security vulnerability exploitation paths, ranks vulnerabilities, removes false positives, suggests next actions, and predicts next targets.

14 Claims, 15 Drawing Sheets

100

100

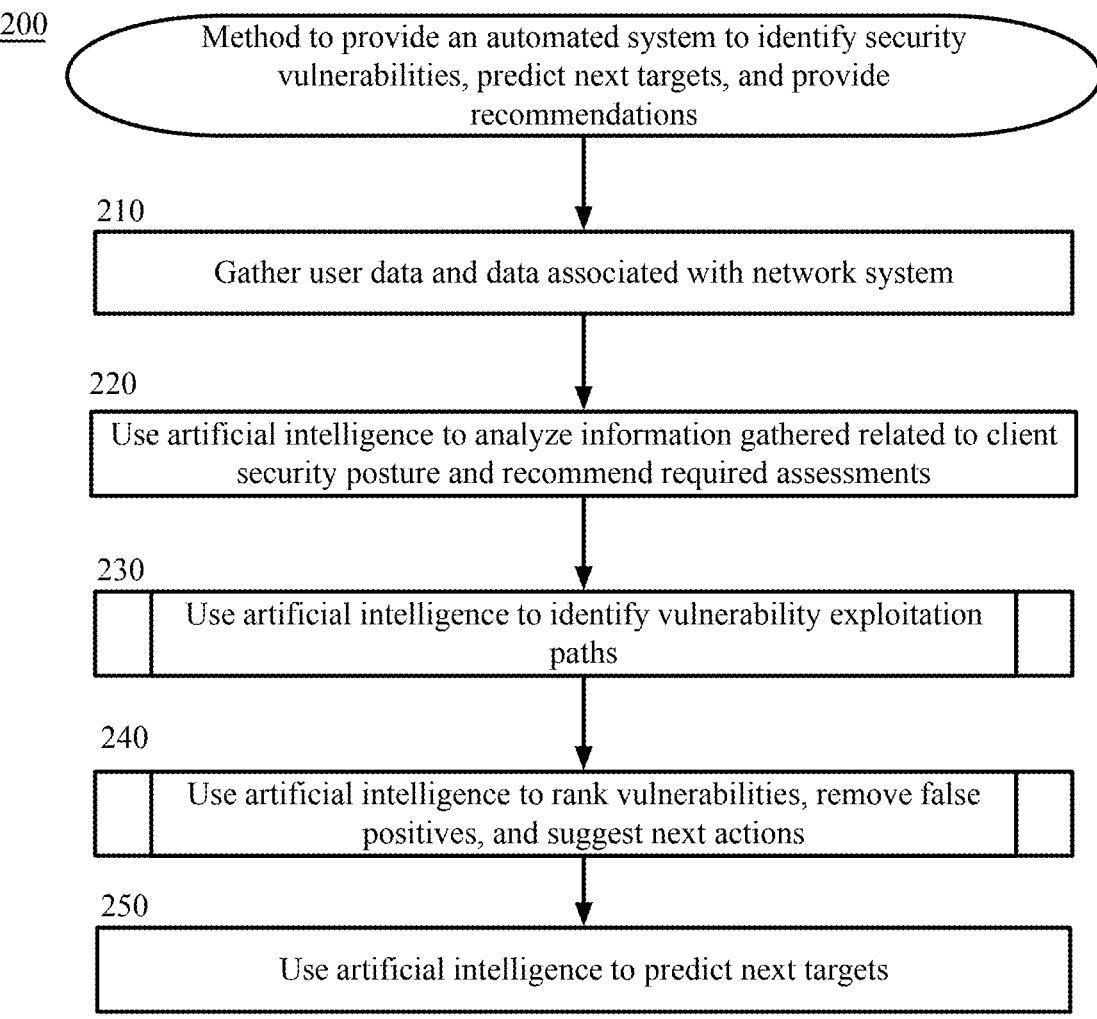

200

Method to provide an automated system to identify security vulnerabilities, predict next targets, and provide recommendations

210

Gather user data and data associated with network system

220

Use artificial intelligence to analyze information gathered related to client security posture and recommend required assessments

230

Use artificial intelligence to identify vulnerability exploitation paths

240

Use artificial intelligence to rank vulnerabilities, remove false positives, and suggest next actions

250

Use artificial intelligence to predict next targets

Fig. 2

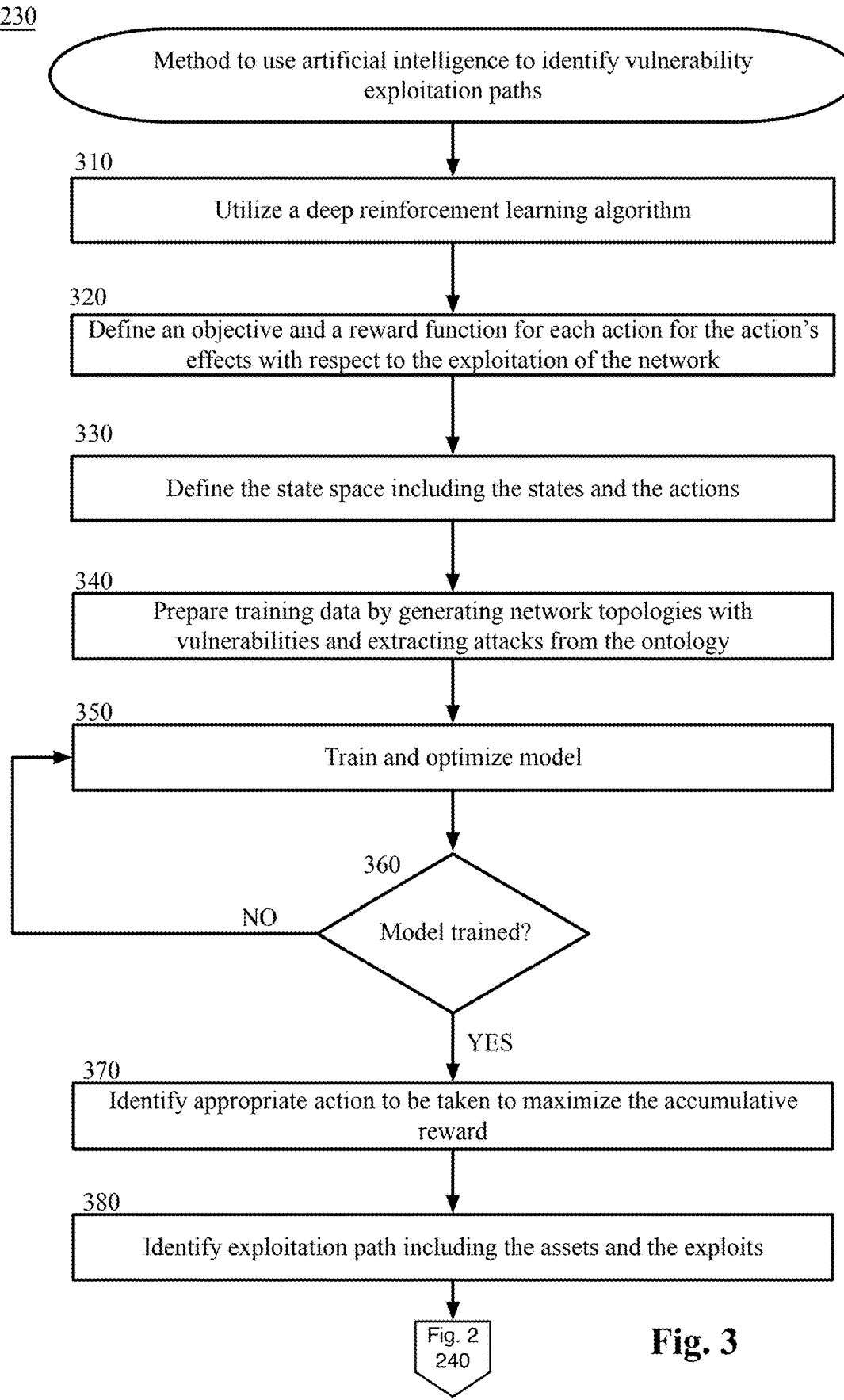

230

Method to use artificial intelligence to identify vulnerability exploitation paths 310 — Utilize a deep reinforcement learning algorithm 320 — Define an objective and a reward function for each action for the action's effects with respect to the exploitation of the network 330 — Define the state space including the states and the actions 340 — Prepare training data by generating network topologies with vulnerabilities and extracting attacks from the ontology 350 — Train and optimize model 360 — Model trained?

NO

YES

370 — Identify appropriate action to be taken to maximize the accumulative reward 380 — Identify exploitation path including the assets and the exploits

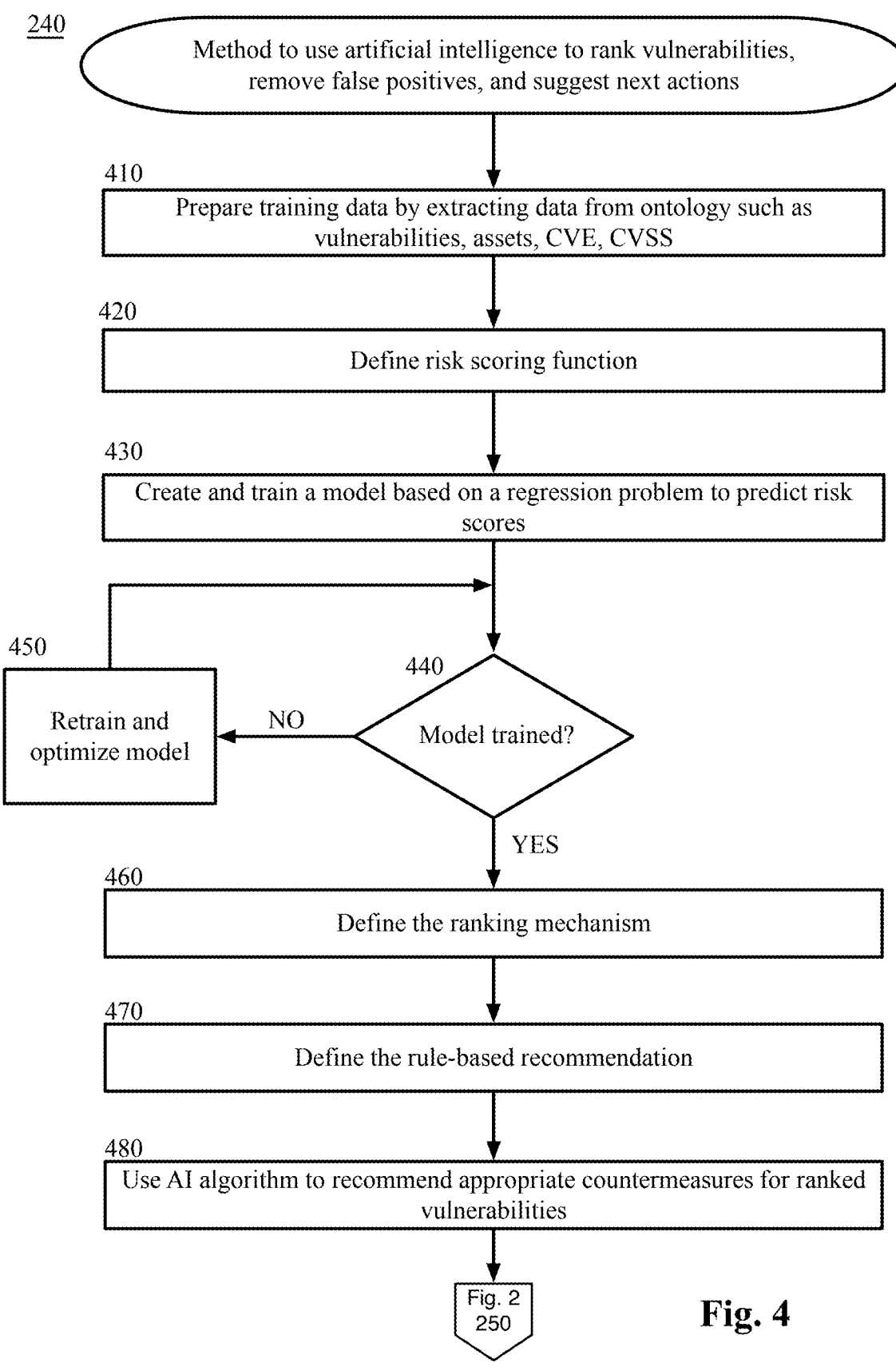

240

Method to use artificial intelligence to rank vulnerabilities, remove false positives, and suggest next actions

410

Prepare training data by extracting data from ontology such as vulnerabilities, assets, CVE, CVSS

420

Define risk scoring function

430

Create and train a model based on a regression problem to predict risk scores

450

Retrain and optimize model

440

Model trained?

NO

YES

460

Define the ranking mechanism

470

Define the rule-based recommendation

480

Use AI algorithm to recommend appropriate countermeasures for ranked vulnerabilities Fig. 2
250

Key          505

A = Attacked assets
S = Secure assets
L = Assets at low risk
H = Assets at high risk

| OS | Windows | Linux |
|---|---|---|
| 0 | 0.5 | 0.5 |

| OS | IIS(True) | IIS(False) |
|---|---|---|
| 0 Windows | 0.94 | 0.06 |
| 1 Linux | 0.28 | 0.72 |

| OS | TOC(True) | TOC(False) |
|---|---|---|
| 0 Windows | 0.59 | 0.41 |
| 1 Linux | 0.80 | 0.20 |

| OS | Apache(True) | Apache(False) |
|---|---|---|
| 0 Windows | 0.47 | 0.53 |
| 1 Linux | 0.25 | 0.75 |

| | TOC | Apache | IIS | Kafka(True) | Kafka(False) |
|---|---|---|---|---|---|
| 0 | True | True | True | 0.20 | 0.80 |
| 1 | True | True | False | 0.64 | 0.36 |
| 2 | True | False | True | 0.98 | 0.02 |
| 3 | True | False | False | 0.84 | 0.16 |
| 4 | False | True | True | 0.42 | 0.58 |
| 5 | False | True | False | 0.95 | 0.05 |
| 6 | False | False | True | 0.52 | 0.48 |
| 7 | False | False | False | 0.34 | 0.66 |

| | TOC | Apache | IIS | MySQL(True) | MySQL(False) |
|---|---|---|---|---|---|
| 0 | True | True | True | 0.84 | 0.16 |
| 1 | True | True | False | 0.87 | 0.13 |
| 2 | True | False | True | 0.94 | 0.06 |
| 3 | True | False | False | 0.48 | 0.52 |
| 4 | False | True | True | 0.67 | 0.33 |
| 5 | False | True | False | 0.08 | 0.92 |
| 6 | False | False | True | 0.65 | 0.35 |
| 7 | False | False | False | 0.35 | 0.66 |

| | TOC | Apache | IIS | SQL(True) | SQL(False) |
|---|---|---|---|---|---|
| 0 | True | True | True | 0.50 | 0.50 |
| 1 | True | True | False | 0.22 | 0.78 |
| 2 | True | False | True | 0.25 | 0.75 |
| 3 | True | False | False | 0.60 | 0.40 |
| 4 | False | True | True | 0.98 | 0.02 |
| 5 | False | True | False | 0.32 | 0.68 |
| 6 | False | False | True | 0.29 | 0.71 |
| 7 | False | False | False | 0.47 | 0.53 |

Fig. 8

| | OS | TOC | Apache | IIS | SQL | MySql | Kafka |
|---|---|---|---|---|---|---|---|
| 0 | Linux | 1 | 0 | 1 | 1 | 1 | 0 |
| 1 | Linux | 1 | 0 | 1 | 1 | 1 | 1 |
| 2 | Linux | 0 | 0 | 1 | 1 | 1 | 0 |
| 3 | Windows | 0 | 0 | 1 | 1 | 0 | 0 |
| 4 | Windows | 1 | 1 | 0 | 1 | 0 | 0 |
| 5 | Linux | 1 | 0 | 1 | 1 | 0 | 0 |
| 6 | Windows | 0 | 1 | 1 | 1 | 0 | 0 |
| 7 | Windows | 0 | 0 | 1 | 1 | 1 | 1 |
| 8 | Linux | 1 | 0 | 1 | 1 | 1 | 1 |
| 9 | Linux | 1 | 0 | 1 | 0 | 0 | 0 |

Fig. 9

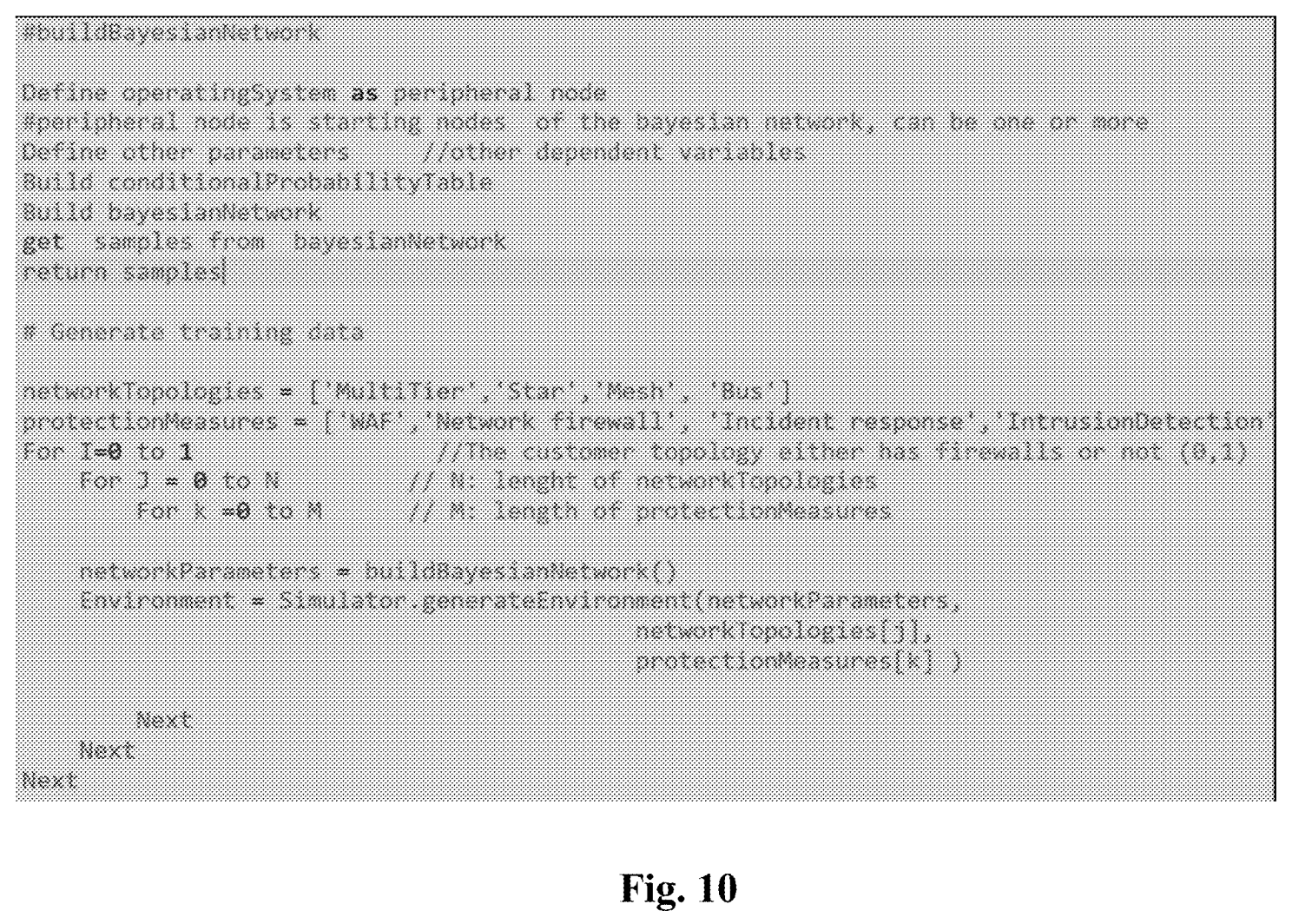

```
BuildBayesianNetwork()

Define operating system as peripheral node
    Peripheral node is starting node of the Bayesian Network, can be one or more
    Define other parameters /other dependent variables
    Build conditionalProbabilityTable
    Build BayesianNetwork Get samples from BayesianNetwork
    Return samples // Generate training data networkTopologies = [ 'Multistar', 'Star', 'Mesh', 'Bus' ]
    protectionMeasures = [ 'NAF', 'Network firewall', 'Incident response', 'Intrusion Detection']

For i = 0 to M      // The customer topology, either has firewalls or not (0,1)
        For j = 0 to N  // Length of networkTopologies
            For k = 0 to K  // Length of protectionMeasures networkParameters = buildBayesianNetwork()
                environment = Simulator.generateEnvironment(networkParameters,
                                                            networkTopologies[j],
                                                            protectionMeasures[k])

Next
        Next
    Next
```

Fig. 10

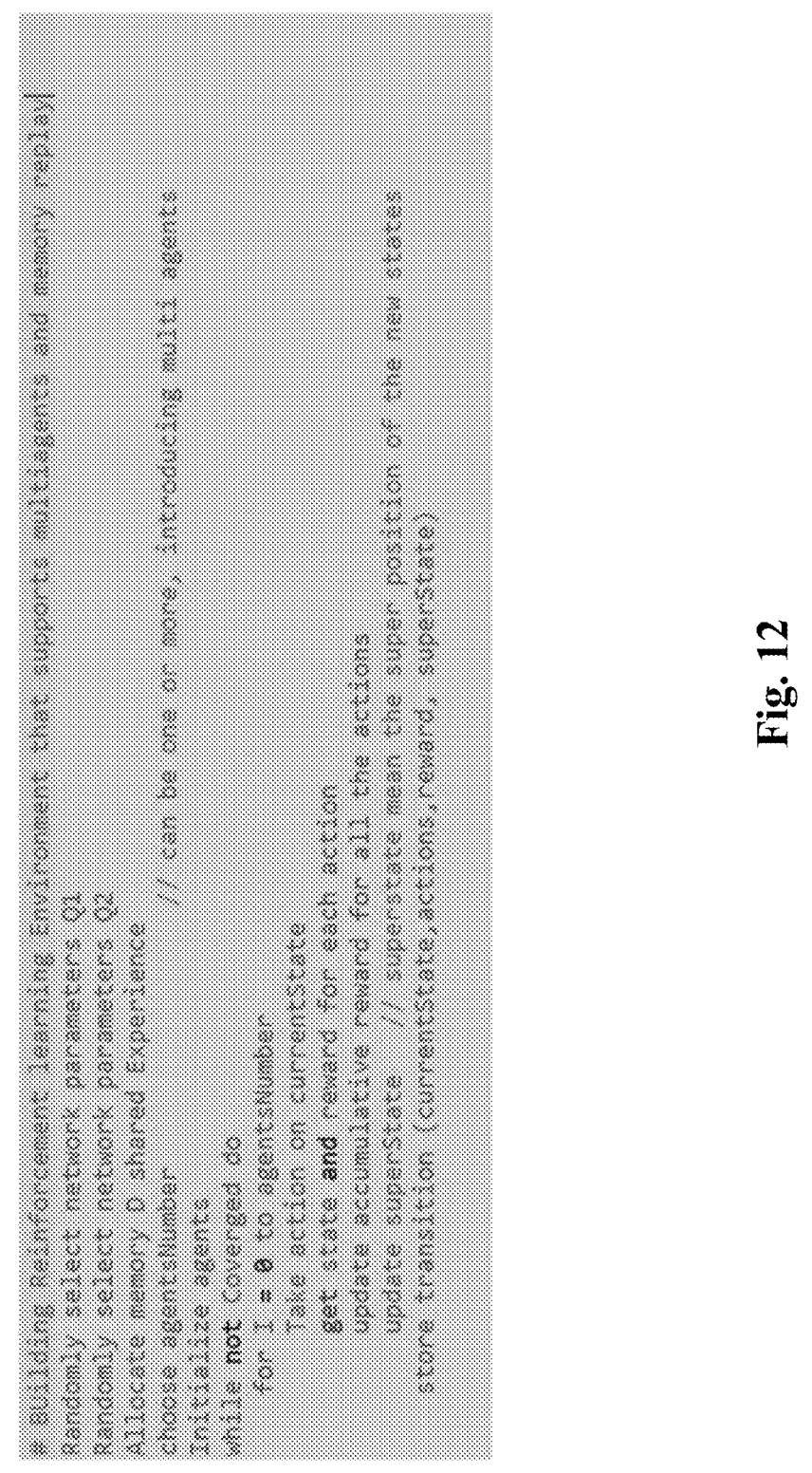

```
Algorithm: reinforcement learning through ... interaction and shared experience
Randomly select network parameters Q,θ
Randomly select network parameters Q',θ'
Allocate memory D shared Experience
Choose agent number N
Initialize agents
while not covered do
    for i = 0 to agent number // (can be one or more, interacting multi-agent)
        Take action on current state
        get state and reward for each action
        update accumulative reward for all the actions
        update states // superstate mean the super position of the result of the states
        store transition (current state, actions, reward, superstate)
```

Fig. 12

```
# Model Training
Take sample minibatch a transition from D
for transition (s_i, a_i, r_i, s_done_i) in minibatch do
    if done_i then
        y_i=r_i
    else
        y_i = r_i + a Q(s_i+1, a_i)
    end
    Loss L = 1/N * (Q(s_i,a_i)-y_i)^2
    Update Q using stochastic gradient descent "minimize loss"
every C step copy weights Q to Q
end
```

Fig. 13

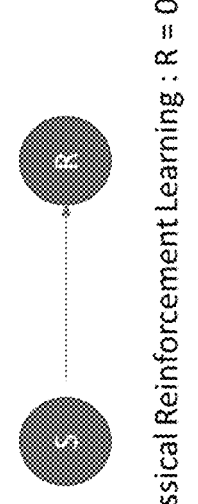
Classical Reinforcement Learning : R = 0.5
Bayesian Reinforcement Learning, p(R) will have the following probability mass function.
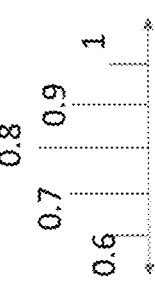
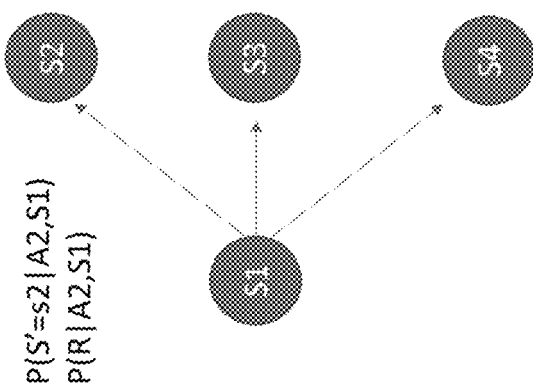
P(S'=s2|A2,S1)
P(R|A2,S1)
Fig. 14

AUTOMATED SYSTEM TO ASSESS NETWORK SYSTEMS SECURITY, EXPLOIT VULNERABILITIES, AND PROVIDE SECURITY RECOMMENDATIONS

FIELD OF THE INVENTION

The technology relates generally to the field of security assessments and testing, and more particularly to methods and systems to use artificial intelligence ("AI") for red-teaming activities and penetration testing, including security assessments, vulnerability exploitation, vulnerability ranking, and next action recommendations.

BACKGROUND OF THE INVENTION

Red teaming activities and penetration testing have traditionally been heavily dependent on human testers and their toolkits of commercial and proprietary tools. Red teaming is the practice of testing the security of a network system by employing a team to act as malicious actors to hack into secure systems or data. A red team of human experts is designed to find vulnerabilities in the network system to prepare for a wide variety of cyberattacks and breach scenarios before they occur.

For an organization to do a full scan of an attack surface of its network system, the organization is forced to use several tools from different providers. The organization needs to provide the appropriate set up for each tool, rely on the security experts (either internal experts or experts from a security service) to perform the assessments and collect the results. Then the organization requires the security experts to analyze the results, neglect false positives, and provide a next action plan.

The process is repetitive and requires many layers of human intervention, especially with the number of attack scenarios increasing daily. This process is made more difficult due to a shortage of qualified cyber security experts. Further, the process is ineffective because new attack paths are identified and exploited by malicious actors faster than a red team can identify them. Conventional systems are unable to automate different security assessments in one platform. Conventional systems are unable to create models required to perform a complex vulnerability analysis in real time. Conventional systems are unable to implement the vulnerability exploitation paths without human intervention.

SUMMARY

In certain embodiments, a system to provide connections to use artificial intelligence to secure a network system includes a processor of a service provider communicatively coupled to a storage device, wherein the processor executes application code instructions that are stored in the storage device to cause the system to: identify data associated with a network system; use artificial intelligence to analyze the data to identify recommended security assessments; use artificial intelligence to identify vulnerability exploitation paths; use artificial intelligence to rank the vulnerabilities; use artificial intelligence to determine exploitation paths that provide the greatest rewards; and use artificial intelligence to suggest security actions based on the ranked vulnerabilities.

In one example, the system may further include application code instructions to cause the system to display a graphical user interface representing a security status for one or more nodes of the network system.

In a further example, the graphical user interface may indicate the security status for each of the one or more nodes of the network system based on a color or other visual indication.

In another example, using artificial intelligence to identify security vulnerability exploitation paths is performed with a deep reinforcement learning algorithm. Outputs of the assessed vulnerabilities may be used to identify security vulnerability exploitation paths.

In one example, using artificial intelligence to perform the recommended security assessments to identify vulnerability exploitation paths is performed with reinforcement learning. In another example, using artificial intelligence to identify vulnerability exploitation paths is performed as a combinatorial optimization problem where an objective of a model of the network system is to find a best exploitation path for vulnerabilities.

In a further example, using artificial intelligence to rank the vulnerabilities further comprises using deep learning or machine learning algorithms to predict a risk score for each vulnerability and to rank each vulnerability.

The system may include application code instructions to cause the system to use artificial intelligence to predict a next asset that is most likely to be attacked.

In another example, using artificial intelligence to predict a next asset that is most likely to be attacked is performed based on a deep reinforcement learning algorithm.

In another example, the system includes application code instructions to cause the system to use artificial intelligence to recommend appropriate countermeasures for one or more of the ranked vulnerabilities.

In one example, the system further comprises application code instructions to cause the system to build a unified ontology from different available security ontologies to be a formal knowledge representation of the network system and of communication between different artificial intelligence and security modules of the processor.

In an example, artificial intelligence to rank the vulnerabilities further comprises identifying false positives based on vulnerabilities that are not identified in any ranked vulnerabilities.

In one example, artificial intelligence is used to suggest security actions based on the ranked vulnerabilities.

In certain embodiments, a method to use artificial intelligence to secure a network system, includes identifying, by one or more computing devices, identify data associated with a network system; using, by the one or more computing devices, artificial intelligence to analyze the data to identify recommended security assessments; using, by the one or more computing devices, artificial intelligence to identify vulnerability exploitation paths; using, by the one or more computing devices, artificial intelligence to rank the vulnerabilities; and using, by the one or more computing devices, artificial intelligence to suggest security actions based on the ranked vulnerabilities.

In one example, the method includes displaying a graphical user interface representing a security status for one or more nodes of the network system.

In a further example, the graphical user interface indicates the security status for each of the one or more nodes of the network system based on a color or other visual indication.

In another example, using artificial intelligence to identify security vulnerability exploitation paths is performed with a deep reinforcement learning algorithm.

In a further example, using artificial intelligence to identify vulnerability exploitation paths is performed as a combinatorial optimization problem where an objective of a model of the network system is to find a best exploitation path for vulnerabilities.

In one example, using artificial intelligence to rank the vulnerabilities further comprises using deep learning or machine learning algorithms to predict a risk score for each vulnerability and to rank each vulnerability.

In an example, the method further includes using artificial intelligence to predict a next asset that is most likely to be attacked.

In one embodiment, a computer program product, comprises a non-transitory computer-readable medium having computer-readable program instructions embodied thereon, the computer-readable program instructions comprising computer-readable program instructions to: identify data associated with a network system; use artificial intelligence to analyze the data to identify recommended security assessments; use artificial intelligence to identify vulnerability exploitation paths; use artificial intelligence to rank the vulnerabilities; and use artificial intelligence to suggest security actions based on the ranked vulnerabilities.

BRIEF DESCRIPTION OF THE DRAWINGS

FIG. 2 is a block flow diagram depicting a method to use artificial intelligence to provide an automated system to identify security vulnerability exploitation paths, predict next targets, and provide recommendations.

FIG. 3 is a block flow diagram depicting a method to use artificial intelligence to automate the implementation of the security assessments to identify vulnerability exploitation.

FIG. 4 is a block flow diagram depicting a method to use artificial intelligence to rank vulnerabilities, remove false positives, and suggest next actions.

FIG. 8 is an illustration of an example sample of the different conditional probabilities between different nodes.

FIG. 9 is an illustration of, based on the conditional probabilities of FIG. 8, generated samples from the Bayesian network.

FIG. 10 is an illustration of example code for generating a diverse range of training data.

FIG. 12 is an illustration of example code to build the multi-agent learning environment.

FIG. 13 is an illustration of example code to generate the model learning process.

FIG. 14 is an illustration of the difference between the MDP (Markov decision process) in case of classical reinforcement learning or Bayesian reinforcement learning.

DETAILED DESCRIPTION

Example System Architecture

Figure 1:
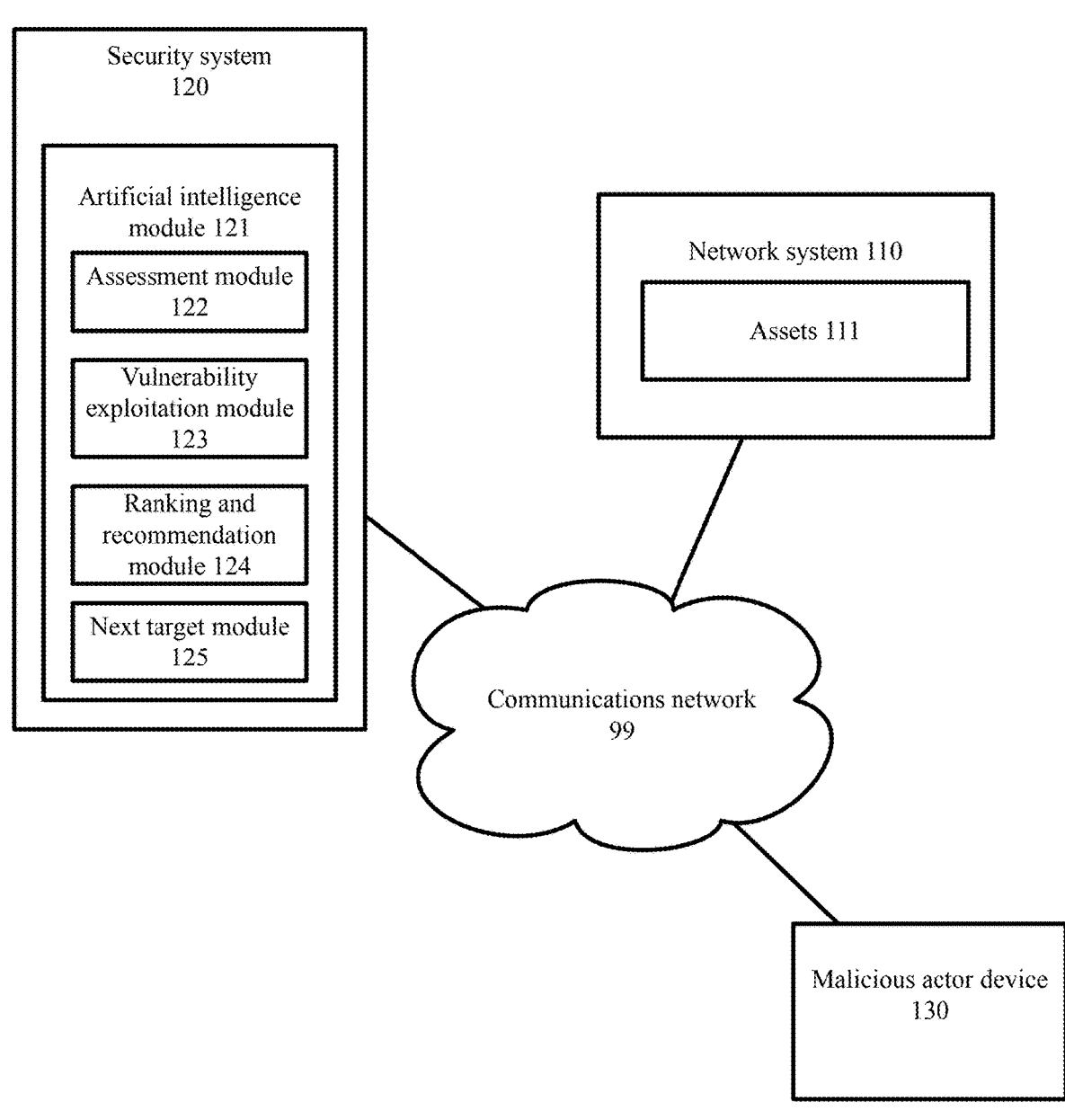
FIG. 1 is a block diagram depicting a system to use artificial intelligence to provide an automated system to identify security vulnerability exploitation paths, predict next targets, and provide recommendations.

FIG. 1 is a block diagram depicting a system to use artificial intelligence to provide an automated system to identify security vulnerability exploitation paths, predict next targets, and provide recommendations. As depicted in FIG. 1, architecture 100 includes a network system 110, a security system 120, and a malicious actor system 130 that are connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the network system 110 is operated by a network operator, a network designer, or other user that may use the network system 110 to operate a system or communicate to other devices to access services or data. The malicious actor device 130 may be operated by a malicious actor, operator, fraudster, or other person or system. The security system 120 is operated by an operator, a security expert, or other user that may use the security system 120 to operate a system or communicate to other devices to perform services. While each server, system, and device shown in the architecture is represented by one instance of the server, system, or device, multiple instances of each can be used.

As shown in FIG. 1, the network system 110 includes one or more assets 111. The assets 111 may be any devices, nodes, servers, software, cloud computing devices, hardware, or any other types of asset that is part of the network system 110 for performing tasks, storing data, providing services, communicating with users, communicating with third-party devices, or performing any other suitable actions. The assets 111 may be vulnerable to outside attack via any type of malicious access from a malicious actor device 130 or other source.

The malicious actor device 130 may represent any type of device, software, hardware, system, server, or other type of entity that desires to attack the security of the network system 110. The malicious actor device 130 may access the network system 110 over the communications network 99 or via any other suitable pathway. The network system 110 may attempt to protect the assets 111 from being accessed, attacked, deleted, stolen, or otherwise compromised by the malicious actor device 130.

As shown in FIG. 1, the security system 120 represents any device, computing system, organization, cloud computing system, or other device or system that is suitable to provide methods or systems to use artificial intelligence to provide an automated system to identify security vulnerability exploitation paths, predict next targets, and provide recommendations. The security system 120 may include an AI module 121. The AI module 121 may host, operate, manage, or otherwise provide an AI system that performs AI functions such as machine learning, deep learning, deep reinforcement learning, neural networks, or any other type of AI functions. The AI functions may be performed by any type of hardware, software, algorithm, server, network, or other type of device or service that provides AI functions.

The AI module 121 hosts functions to perform certain tasks as described herein. In certain examples, the tasks are not performed by separate functions, but are described as different functions herein for clarity. The AI module 121 includes an assessment module 122. The assessment module 122 may perform any suitable AI algorithm, method, or operation to gather data required to assess a security position of the network system 110, analyze the data, and recommend required assessments for the network system 110.

The AI module 121 includes a vulnerability exploitation module 123. The vulnerability exploitation module 123 may perform any suitable AI algorithm, method, or operation to automate the implementation of the security assessments and perform an AI function to identify vulnerabilities exploitation.

The AI module 121 includes a ranking and recommendation module 124. The ranking and recommendation module 124 may perform any suitable AI algorithm, method, or operation to collect generated reports from the assessments and use an AI function to rank all the vulnerabilities, remove false positives, and suggest next actions.

The AI module 121 includes a next target module 125. The next target module 125 may perform any suitable AI algorithm, method, or operation to create a representation of a threat level to different assets 111 of the network system 110 and identify assets 111 that may be likely to be a next target of a malicious attack.

Figure 6:
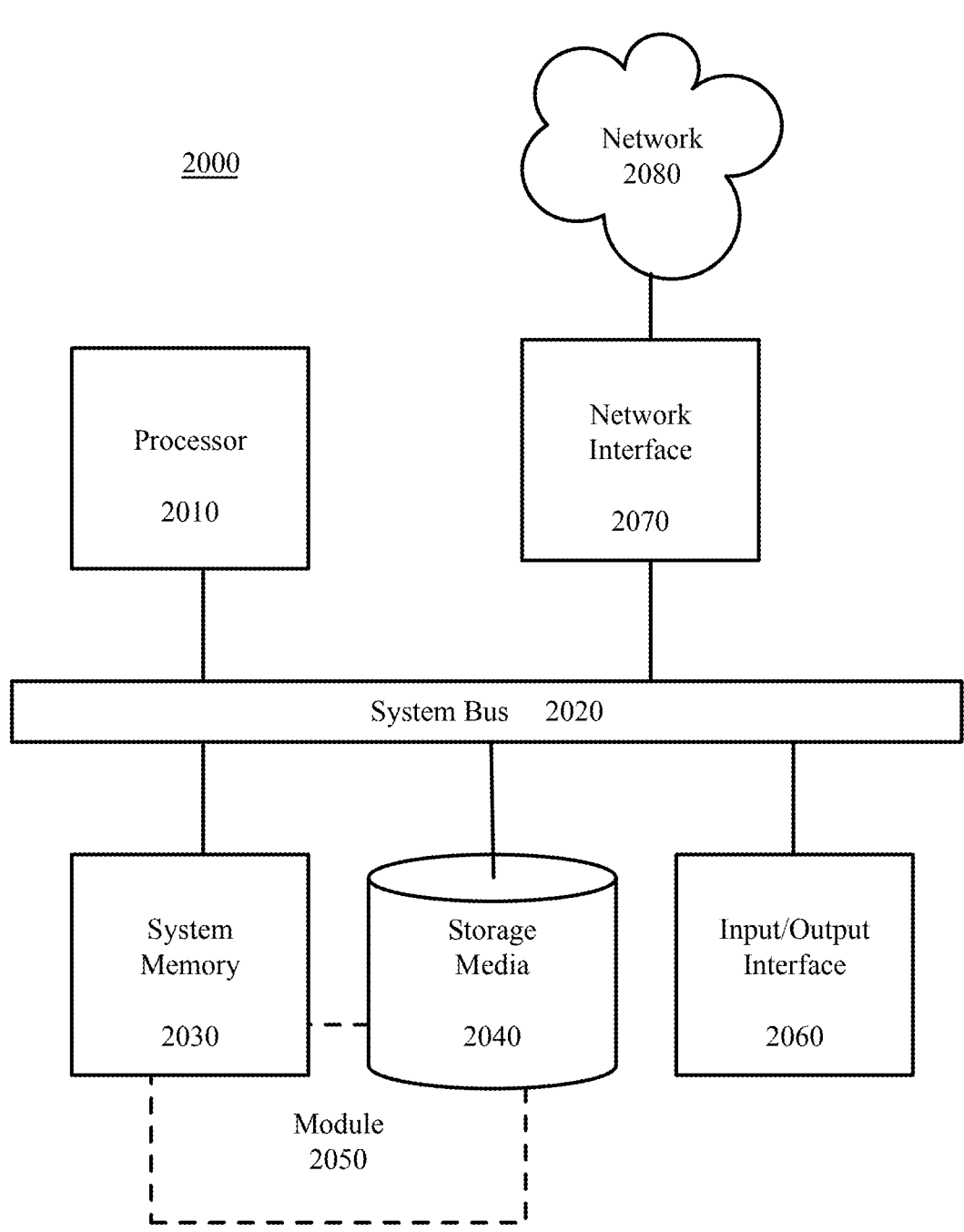
FIG. 6 depicts a computing machine and a module.

In example embodiments, the network computing devices and any other computing machines associated with the technology presented herein may be any type of computing machine such as, but not limited to, those discussed in more detail with respect to FIG. 6. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 6. The computing machines discussed herein may communicate with one another, as well as with other computing machines or communication systems over one or more networks, such as network 99. The network 99 may include any type of data or communications network, including any of the network technology discussed with respect to FIG. 6.

EXAMPLE EMBODIMENTS

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology for embodiments of the invention may employ methods and systems to use artificial intelligence to provide an automated system to identify security vulnerability exploitation paths, predict next targets, and provide recommendations. The centralized system provides an automated platform to perform each primary function of red teaming activities and penetration testing. The AI module 121 performs the following actions to test the system: automated attack surface discovery; automation of penetration testing either internal or external; automation of different cloud security scanning; and automation of network and web scanning. To accomplish these steps, the AI module 121 analyzes information gathered related to a client security posture and recommends required assessments, identifies vulnerability exploitation, ranks vulnerabilities, removes false positives, suggests next actions, and predicts next targets. Some or all of these steps and actions may be performed using AI, while some of these steps and actions may be performed by an automated system.

The examples for embodiments of the invention may employ computer hardware and software, including, without limitation, one or more processors coupled to memory and non-transitory computer-readable storage media with one or more executable computer application programs stored thereon, which instruct the processors to perform such methods.

The example methods illustrated in FIGS. 2-4 are described hereinafter with respect to the components of the example communications and processing architecture 100.

FIG. 2 is a block flow diagram depicting a method 200 to use artificial intelligence to provide an automated system to identify security vulnerability exploitation paths, predict next targets, and provide recommendations.

In block 210, the security system 120 gathers user data and data associated with network system 110. The security system 120 receives data from the network system 110 directly, such as via the network 99, from operators of the security system 120 or the network system 110, from third-party sources, or from any other suitable source. The data may be associated with any operations or components of the network system 110, such as the type of hardware and software operated, the number and type of assets 111, the type of customers or users of the network system 110, the security measures in place, the types of previous attacks, the types of attacks in the relevant industry, and any other suitable data.

In an example, the security system 120 builds a unified ontology from different available cyber security ontologies to be the formal knowledge representation of cyberspace concepts and properties and the foundation of the communication between the different AI and security modules in the security system 120. An ontology encompasses a representation, formal naming, and definition of the categories, properties, and relations between the concepts, data, and entities that substantiate one, many, or all domains of discourse. The ontology can be used as general vocabulary, roadmap, and extensible dictionary of the domain that the ontology is representing. The ontology provides an overall view of the domain of information security as well as a classification and definition of specific domain vocabulary. The ontology is built upon the main security components: assets, threats, vulnerabilities, and countermeasures.

The ontology may be used by the security system 120 to extract all possible attacks. Based on the assets, threats, vulnerabilities, and countermeasures, the security system 120 may chart or diagram the types of threats to which the network system 110 may be vulnerable. For example, a threat may be a passive or active attack. In a further example, an active attack may be a malformed input attack or a denial or service attack. The malformed input attack may be a buffer overflow that creates a stack overflow or an integer overflow. By charting the types of threats to which the network system 110 may be vulnerable, the system can use the types of threats in the building and refining of the models of the network system 110, the vulnerabilities, the next actions, and other models.

During training of the different AI algorithms as described herein, the ontology provides training data for each of the AI models. The data from the ontology will be used to define the state space for the reinforcement learning problems and other types of AI processes. During inference, the output of each security assessment is passed to a knowledge mapping layer to be modified to the ontology standard communication language. Then the output is passed as an input to the AI trained models for prediction.

In block 220, the security system 120 uses artificial intelligence to analyze information gathered related to a client security posture and recommend required assessments. The security system 120, using the assessment module 122, may use the ontology and the threat chart as machine learning inputs. The security system 120 learns based on the inputs which types of security assessments will most effectively identify system vulnerabilities. As more ontologies and threat charts are inputted into the AI algorithms along with security vulnerability outcomes, the assessment module 122 is able to learn which combinations of ontologies and threat charts create certain combinations of vulnerabilities. Based on the likely vulnerabilities, the assessment module 122 recommends the assessments that will likely identify the vulnerabilities. The list of recommended assessments is provided to an operator of the security system 120, directly to the vulnerability exploitation module 123, or to any suitable party or device.

In block 230, the security system 120 uses artificial intelligence to identify vulnerability exploitation.

The details of method 230 of block 230 are discussed in greater detail with respect to FIG. 3.

FIG. 3 is a block flow diagram depicting a method 230 to use artificial intelligence to identify vulnerability exploitation paths. Exploitation is a primary bottleneck in the field of automation of penetration testing. Using AI to perform the tasks can identify possible attack paths that elude conventional automation or threat analysis by analyzing information gathered related to a client security posture and recommending required assessments, identifying vulnerabilities, ranking vulnerabilities, removing false positives, suggesting next actions, and predicting next targets. The method 230 may use extracted vulnerabilities and attacks from the security ontology as training data sources. The method 230 will use generated data of different network topologies and vulnerabilities as training data sources. The input data in inference includes partial network topology with vulnerabilities. The output data in inference will include one or more exploitation paths. An example algorithm will use deep reinforcement learning algorithm DQN "Deep Q Net." If the security system 120 does not achieve the expected performance, then the method 220 may employ an actor critic algorithm. DQN is widely used in reinforcement learning algorithms that obtain an optimal policy by choosing the action that produces the highest state-action value. DON is often a best fit for discrete state space, which may be the case in the problem described herein.

The method 230 of FIG. 3 may include the following blocks.

In block 310, the security system 120, using the vulnerability exploitation module 123, utilizes a deep reinforcement learning algorithm. The deep reinforcement learning algorithm may be the DON "Deep Q Net" algorithm. The algorithm may be selected by an operator or other entity of the security system 120. The algorithm may be associated with the assessment module 122, such as by downloading the algorithm on the assessment module 122. The deep reinforcement learning algorithm may be installed on the vulnerability exploitation module 123 or any other suitable hardware or software of the security system 120.

The deep reinforcement learning algorithm relies on the security ontologies and any suitable exploit database to provide part of the action space for the RL agents, and with the right environment, the agents will learn the possible attack paths during the training process by themselves. In alternate embodiments, the deep reinforcement learning algorithm represents the exploitation problem as a combinatorial optimization problem where the objective is to find the best exploitation path for vulnerabilities. Combinatorial Optimization is the problem of finding an optimal object from a finite set of objects, where the set of feasible solutions is discrete or can be reduced to a discrete set.

In block 320, the vulnerability exploitation module 123 defines an objective and a reward function for each action for the action's effects with respect to the exploitation of the network. In block 330, the vulnerability exploitation module 123 defines the state space including the states and the actions. In block 340, the vulnerability exploitation module 123 prepares training data by generating network topologies with vulnerabilities and extracting attacks from the ontology.

In block 350, the vulnerability exploitation module 123 trains and optimizes the model. The vulnerability exploitation module 123 may train the model by providing additional training data. The vulnerability exploitation module 123 may further provide outcomes of actual scenarios wherein vulnerabilities have been exploited on the present network system 110 or on systems with similar network topologies. As additional data is input into the algorithm, the vulnerability exploitation module 123 is trained to provide more accurate results.

In block 360, the vulnerability exploitation module 123 determines if the model is trained. The model may be determined to be trained when the model is able to achieve an objective with maximized reward. If the model is not trained, the method 230 follows the NO path back to block 350 for additional training, such as by providing additional training data inputs. If the model is trained, the method 230 follows the YES path to block 370.

In block 360, the vulnerability exploitation module 123 identifies appropriate action to be taken to maximize the accumulative reward. By maximizing the accumulative reward, the method 230 allows the vulnerability exploitation module 123 to more accurately arrive at the model that identifies the most likely exploitation paths. In block 370, the vulnerability exploitation module 123 identifies the exploitation path including the assets and the exploits. The vulnerability exploitation module 123 outputs the asset that is likely to be vulnerable and the exploitation path to which the asset is vulnerable.

In block 380, the vulnerability exploitation module 123 identifies the exploitation path including the assets and the exploits. The paths identified may include more than one asset or exploit. For example, a first exploit may gain access to an asset for a malicious actor. A second exploit may only be effective for the malicious actor upon gaining access to the first asset. The malicious actor may use the second exploit to gain access to a second asset. Any route or path using any combination of exploits may be used to gain access to any number of assets. In one example, the combination of exploits and paths may be solved by the model as a combinatorial optimization problem where the objective is to find the best exploitation path for vulnerabilities.

The following provides an example of an attack path proceeding along a path on a network topology. The first state is a network topology with vulnerabilities. The first action is based on a malicious actor that establishes a successful Transmission Control Protocol ("TCP") connection. The second state is a vulnerable topology with an open TCP connection. The subsequent second action is a brute force attack. The third state is where the network is exploited through a vulnerable user. The subsequent third action is a privilege escalation. The fourth state is that the malicious actor gets access to admin user. The subsequent fourth action is active directory scanning. Each step in the path is required to arrive at the final action. The AI must follow many potential paths to explore all vulnerabilities. Merely checking single actions and single consequences would not expose this vulnerability.

From block 380, the method 230 returns to FIG. 2.

Returning to FIG. 2, in block 240, the security system 120 uses artificial intelligence to rank vulnerabilities, remove false positives, and suggest next actions.

The details of method 230 of block 240 are discussed in greater detail with respect to FIG. 4.

FIG. 4 is a block flow diagram depicting a method to use artificial intelligence to rank vulnerabilities, remove false positives, and suggest next actions.

The security system 120 uses open-source ontologies for security vulnerabilities to build a centralized database of different vulnerability types. The security system 120 builds a risk scoring mechanism for the different security vulnerabilities. Each of the security assessments will output different vulnerabilities, some with a lower priority, some with a higher priority, and some that are a false positive. The security system 120 seeks to define to the customer what are the real vulnerabilities to be resolved first and with which countermeasure.

The security system 120 uses deep learning and/or machine learning to predict the risk score for the vulnerabilities and rank the vulnerabilities accordingly. The vulnerabilities that are not exploited or categorized into any of the categories will be labeled as false positives. The security system 120 uses extracted vulnerabilities, assets, and countermeasures from the security ontology as the training data source. The list of detected vulnerabilities and the affected assets are used as input data for the inference. The output data from the security system 120 is ranked vulnerabilities, with false positives having a lowest, or zero, ranking. The output data from the security system 120 includes recommendations of countermeasures. The security system 120 may combine deep learning regression algorithms with a rule-based approach to rank vulnerabilities and recommend countermeasures.

The security system 120 may employ CVSS ("Common Vulnerability Scoring System"), which is an open industry standard for assessing the severity of computer system security vulnerabilities. CVSS assigns severity scores to vulnerabilities, allowing responders to prioritize responses and resources according to threat.

In block 410 of FIG. 4, the security system 120, using the ranking and recommendation module 124, prepares training data by extracting data from ontology such as vulnerabilities, assets, Common Vulnerabilities and Exposures ("CVE"), and CVSS. The ontology of the network system 110 as described herein may be used as training data. The ranking and recommendation module 124 may use any suitable industry standard or proprietary security vulnerability databases or scoring system as training data.

In block 420, the ranking and recommendation module 124 defines risk scoring functions. The ranking and recommendation module 124 builds a risk scoring mechanism for the different security vulnerabilities. Each of the security assessments will output different vulnerabilities, some with a lower priority, some with a higher priority, and some that are a false positive. The security system 120 seeks to define to the customer what are the real vulnerabilities to be resolved first and with which countermeasure.

In block 430, the ranking and recommendation module 124 creates and trains a model based on a regression problem to predict risk scores. The model may combine a deep learning regression algorithm with a rule-based approach or use any other suitable algorithm or AI function.

In block 440, the ranking and recommendation module 124 determines if the model is trained. The determination may be based on the outputs providing sufficiently accurate data or based on any other suitable standard. The model may be determined to be trained when the model provides high accuracy and is able to generalize to unseen data. If the model is not trained, the method 240 follows the NO path back to block 450 for additional training and optimization of the model, such as by providing additional training data inputs. If the model is trained, the method 240 follows the YES path to block 460.

In block 460, the ranking and recommendation module 124 defines the ranking mechanism. In block 470, the ranking and recommendation module 124 defines the rule-based recommendations. In block 480, the ranking and recommendation module 124 uses the AI algorithm to recommend appropriate countermeasures for ranked vulnerabilities. The ranking and recommendation module 124 provides the list of ranked vulnerabilities and the appropriate countermeasures to an operator or other user or device of the network system 110. The list and the countermeasures may be provided in any suitable format or communication technology, such as in an email, a display on a user interface of the network system 120, a display on a website, or any other suitable display. In certain examples, the list and the countermeasures are provided to a subsequent AI that will address the security of the network system 110.

From block 480, the method 240 returns to block 250 of FIG. 2.

Returning to FIG. 2, in block 250, the security system 120 uses AI to predict next targets. To predict the next target the security system 120 represents the network topology as a graph data structure where each IP address (or other device, node, function, module, or other system of the network system 110) is represented as a graph node and the link between two addresses is represented as a graph edge. The security system 120 represents the problem as a reinforcement learning problem and the actions to be possible attacks to allow more assets to be exploited. This process reduces an effective problem dimensionality for the system. The security system 120 creates a visualization of all network assets, classifying currently exposed assets, next target at high risk, target at low risks and secure assets.

Figure 5:
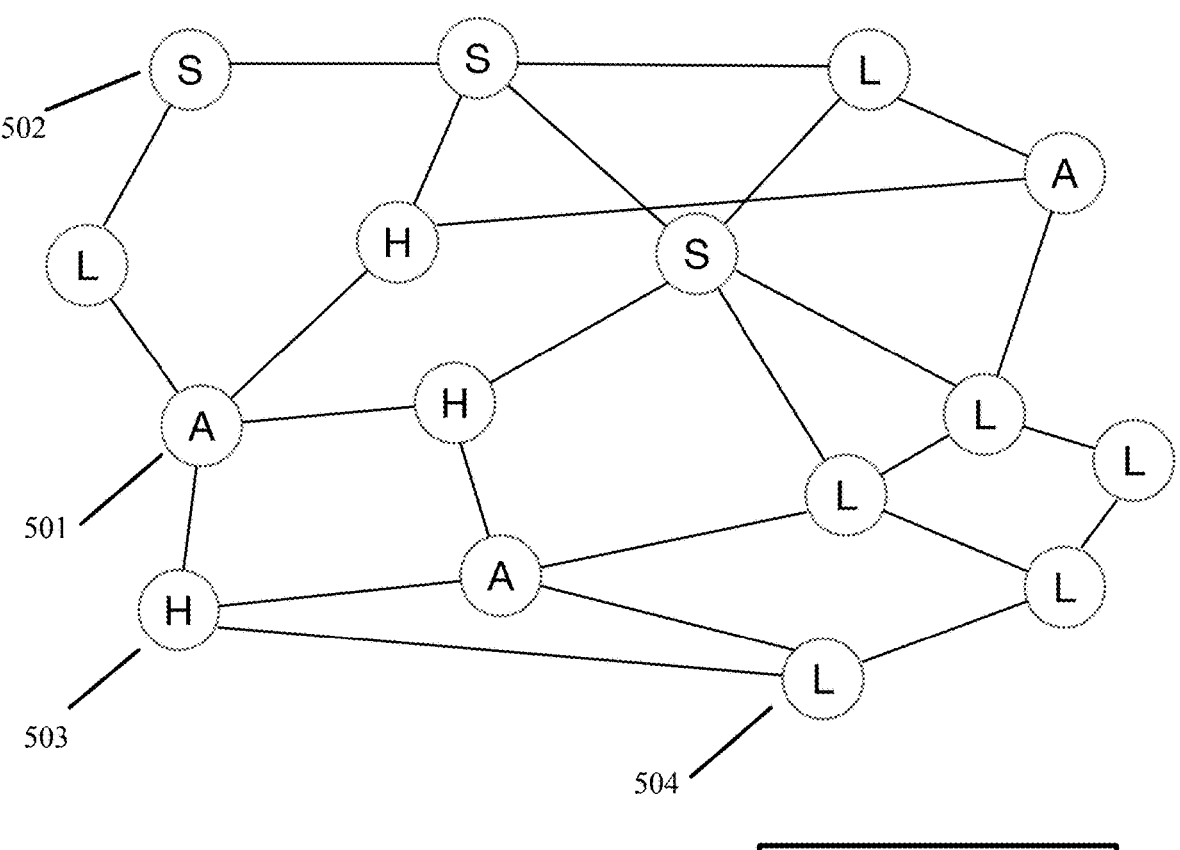
FIG. 5 is an illustration of an example graphical user interface to represent likely next targets in a network system.

An example of the visualization is illustrated in FIG. 5.

FIG. 5 is an illustration of an example graphical user interface 500 to represent likely next targets in a network system 110. The graphical user interface 500 depicts each asset of the network system 110 as a circle representing a node of the network system 110. Each asset, or node, is illustrated with links to other nodes with which the node communicates, is logically linked, or with which the node is otherwise associated. The nodes are designated with a depiction of the security level of each node.

The graphical user interface 500 has a key 505 that describes the meaning of the different depictions of the nodes. For example, a node with an A displayed, such as node 501, is a node that is currently under attack or has recently been under attack.

A node with an S displayed, such as node 502, is a node that is secure from attack. The secure status of the nodes may be based on any suitable factors, such as a result of the model created by the artificial intelligence module 121 as described herein, a distance from an attacked node, or any other suitable determination. In the example, the secure nodes are at least two nodes removed from an attacked node.

A node with an L displayed, such as node 503, is a node that has a low-risk rating. The low-risk status of the nodes may be based on any suitable factors, such as a result of the model created by the artificial intelligence module 121 as described herein, a distance from an attacked node, or any other suitable determination. In the example, the low-risk nodes are only connected to a single attacked node.

A node with an H displayed, such as node 504, is a node that has a high-risk rating. The high-risk status of the nodes may be based on any suitable factors, such as a result of the model created by the artificial intelligence module 121 as described herein, a distance from an attacked node, or any other suitable determination. In the example, the high-risk nodes are connected to two attacked nodes.

In alternate examples, the risk status of the assets, or nodes, may be displayed with any other suitable indication. For example, the risk status may be based on a color scheme, such as a red display for attacked assets, a brown display for high-risk assets, a yellow display for low-risk assets, and a green display for secure assets. Any other display scheme may be envisioned to indicate the risk status of the assets.

Example Machine Learning Processes

Machine Learning

Machine learning is a field of study within artificial intelligence that allows computers to learn functional relationships between inputs and outputs without being explicitly programmed. Machine learning involves a module comprising algorithms that may learn from existing data by analyzing, categorizing, or identifying the data. Such machine-learning algorithms operate by first constructing a model from training data to make predictions or decisions expressed as outputs. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression may be dependent on choosing informative, discriminating, and independent features. Features may comprise numerical data, categorical data, time-series data, strings, graphs, or images. Reinforcement learning is a subfield of machine learning that trains an agent in an environment, and the agent takes actions to achieve the final objective. The agent should take the actions that maximize the accumulative reward. The agent learns by trial and error.

In order for the deep reinforcement learning modules or algorithms practicing the methods described herein to reach the required accuracy and to generalize, certain parameters may be needed. For example, in certain systems, a machine learning algorithm should be trained on a diverse set of networks and may be tasked with bypassing security measures. The state space should be represented properly to assure convergence.

To address these challenges, the systems described herein may introduce the following approaches. First, the system may use generative models to generate different network parameters that support a diverse set of topologies. The system may employ multi-agent reinforcement learning. The system may also employ leaf injection of algorithms as actions.

The reinforcement-learning machine learning algorithms may be trained on a diverse range of environments to be able to generalize. To achieve this, the system may use the following approach. The system may consider different network topologies, consider the presence of firewalls/antiviruses, consider other security measures that might exist, and consider that the key parameters that define the environment/technology stack are variables. The system may utilize these factors in the training data selection or usage.

Bayesian Network

In one example embodiment, a Bayesian Network ("BN") is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar, or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are described herein for demonstrative purposes. The first method involves computing the joint probability of a particular assignment of values for each variable. The joint probability can be considered the product of each conditional probability and, in some instances, comprises the logarithm of that product. The second method is Markov Chain Monte Carlo ("MCMC"), which can be implemented when the sample size is large. MCMC is a well-known class of sample distribution algorithms.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate.

The system may use Bayesian Networks to generate different network parameters. The system may define a group of random variables that represents the key parameters that might vary from one environment to another like operating systems ("OS"), web servers, database servers, and other parameters. The system may use the Bayesian networks to capture the joint probabilities behind the different random variables. The system may conduct the general/overall behavior of the network from the local likelihood or the behavior of the random variables. The system may use the Bayesian networks to generate data.

Figure 7:
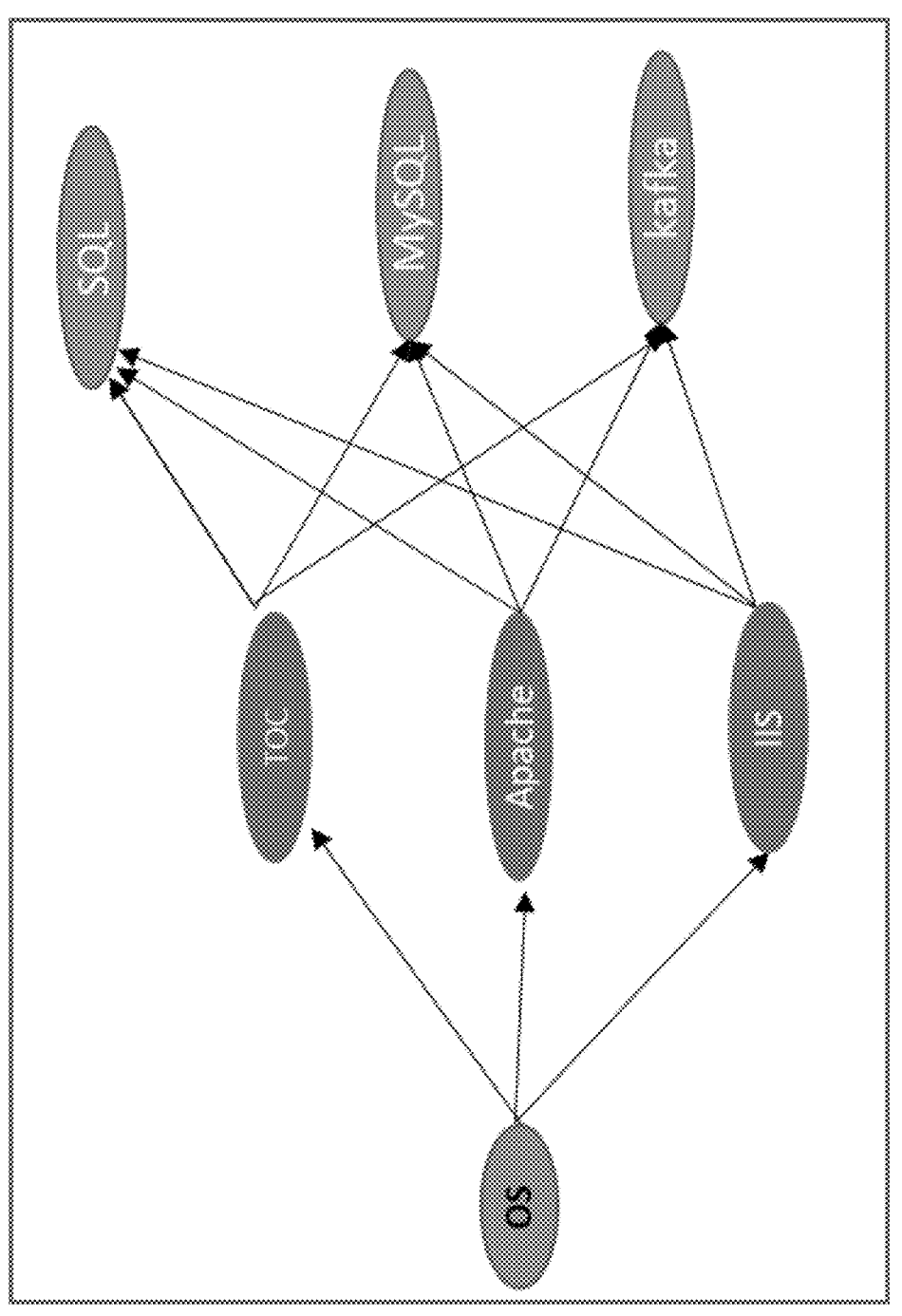
FIG. 7 is an illustration of a subset of a Bayesian network that displays some key parameters to consider and how they are connected to each other.

FIG. 7 is an illustration of a subset of a Bayesian network that displays some key parameters to consider and how they are connected to each other. The operating system is illustrated as the starting node of the Bayesian network. The operation system considered to be either windows or Linux.

FIG. 8 is an illustration of an example sample of the different conditional probabilities between different nodes. In diagram 2, the prior knowledge (initial probabilities for the random variables) may have a probabilistic distribution. In an example, instead of having the distribution of the operating systems be 0.5 windows, the probabilistic distribution will be a number that is within a range of 0.5, such as 0.3, 0.4, 0.5, 0.6, 0.7. This distribution will increase the resulting joint probabilities and hence the generated environments are more generalized and can support a more diverse range of customers' environment. The approach is driven from the fact that uncertainty exists about probabilities of the initial random variables used for the Bayesian network, which is due to the nature of the problem.

FIG. 9 is an illustration of, based on the conditional probabilities of FIG. 8, generated samples from the Bayesian network.

Simulator

In the examples, the system generates a simulator to generate actual network environments. The system may use certain ones of the existing simulators with additional extensions or modifications. The system supports different network components, such as different network topologies (such as multi-tier, star, bus, or mesh]; different security measures (such as firewalls, antiviruses, intrusion detection systems, or incident response); different operating systems; servers and services; different web servers and database servers; and networking devices and Ethernet connectivity.

Example Code

FIG. 10 is an illustration of example code for generating a diverse range of training data.

Multi-Agent Reinforcement Learning

Figure 11:
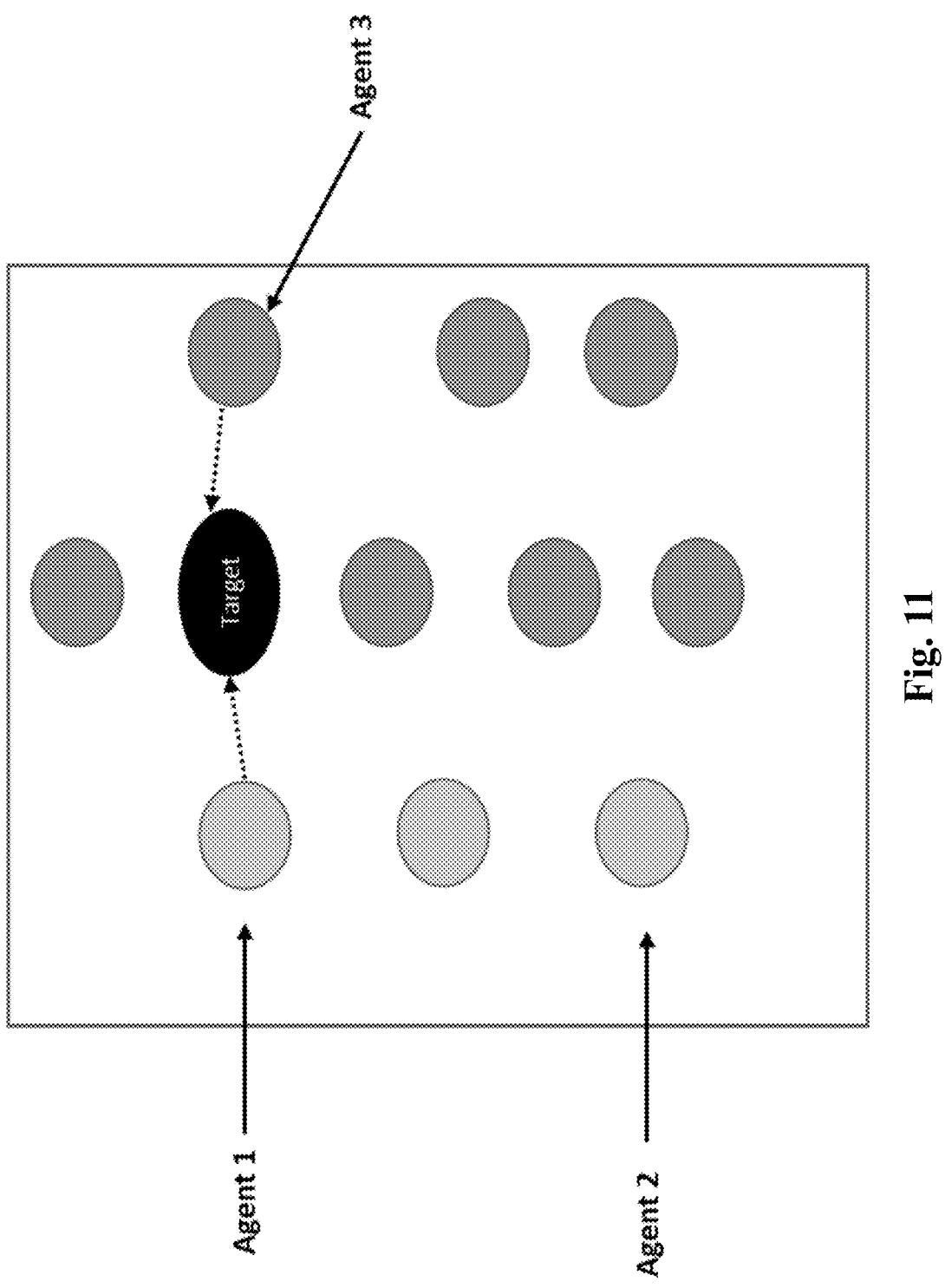
FIG. 11 is an illustration of an example process of a multi-agent reinforcement learning approach.

FIG. 11 is an illustration of an example process of a multi-agent reinforcement learning approach. To assure convergence and reward maximization, the system may rely on a multi-agent reinforcement learning approach. The agents may represent machine learning algorithms or any other machine learning functions. Multiple actions are performed at each stage based on number of agents selected. The system provides a reward at each step that is the accumulated reward across all agents. All numbers of agents contribute to the state change "super state composition." Certain ones of the agents are applied to the assets at the network perimeter. Other ones of the agents may be applied to the vulnerable assets from inside the network. Super state composition represents an accumulation of state transitions across all the agents.

In the example of FIG. 11, Agent 1 and agent 2 are applied at the perimeter, and agent 3 represents malicious internal user and/or compromised machine but not on the perimeter. The example is directed to the collaboration between the agents attacking the inside and the outside.

In the example, Agent 3 was able to compromise a machine through a leaked credential. The compromised user in the example of FIG. 11 is an admin on the active directory. Agent 3 establishes a trust connection with the "target." Once a trust connection is established, Agent 3 will change hard desk permissions on the "target." Once permissions are changed, Agent 1 on a perimeter asset will have more privilege on the "target" since Agent 1 has the ability to perform any action through a remote connection. The collaboration between the agents will facilitate further actions to be performed, allowing the full exploitation of the whole network to be achieved.

Example Code

FIG. 12 is an illustration of example code to build the multi-agent learning environment. In examples, to provide the multi-agent reinforcement learning, code may be used as depicted in FIG. 12.

FIG. 13 is an illustration of example code to generate the model learning process.

Typical reinforcement learning environments provide an explicit reward function, mapping state-action pairs to real numbers. For each state-action pair, a single real number is associated with the state-action pair. In certain examples, the consequences of actions are uncertain, the system needs to model the uncertainty in the environment. To model this, the system may use a Bayesian reinforcement learning approach.

Bayesian reinforcement learning is distinguished from other forms of reinforcement learning by explicitly maintaining a distribution over various quantities, such as the parameters of the model, the reward, the value function, the policy or its gradient. This distribution will help to encode the domain knowledge in the prior distribution to speed up learning, optimize the exploration/exploitation process and consider possible risks.

The system is configured to ensure that the actions taken are not harmful for the customer, such as an action that may result in denial of service or failure. Thus, the system introduces some uncertainty about the possible outcomes that result from the actions. To achieve this, the system defines the reward functions to be a distribution rather than a single number.

FIG. 14 is an illustration of the difference between the MDP (Markov decision process) in the case of classical reinforcement learning or Bayesian reinforcement learning.

Leaf Injection of Algorithms

Reinforcement learning agents are tasked with bypassing security measures and defensive tools at the customer side. So apart from the regular attacks considered in the action space, the reinforcement learning agents are designed to include more actions to overcome the protective measures. Some of these actions will be algorithms to be injected to the action space. Thus, the reinforcement learning module will be designed as an orchestrator that supports injection of other algorithms without the need of modification.

The injection of new algorithms may be an automatic ongoing process. As the security tools evolve and become more advanced, research teams and other processes may develop new methods and tools to bypass the security tools and inject the new methods into the reinforcement learning action space. In this manner, customers become aware of the defects in their security environments before malicious actors are able to exploit the defects.

Figure 15:
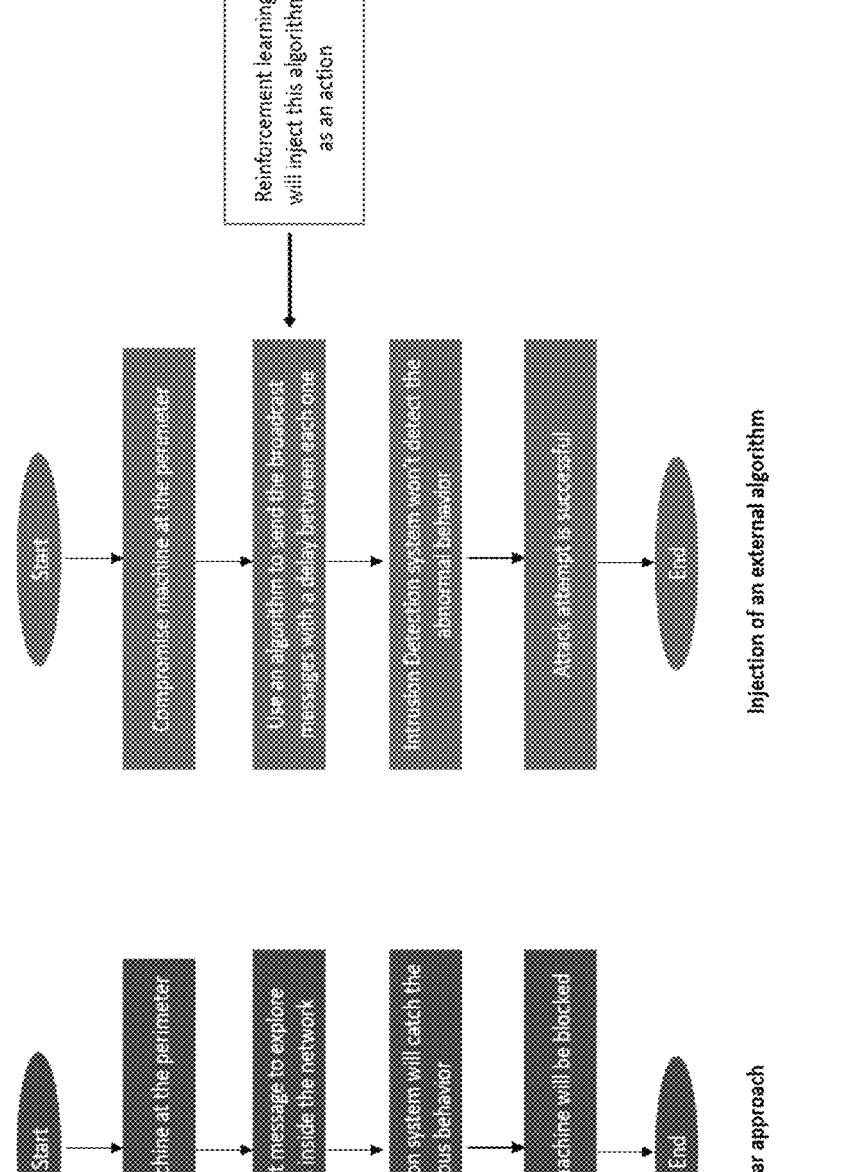
FIG. 15 is an illustration of an example method of a conventional approach and an approach with injection of an external algorithm.

FIG. 15 is an illustration of an example method of a conventional approach and an approach with injection of an external algorithm. The conventional approach does not achieve a successful attack attempt. The approach with injection of an external algorithm injects the algorithm at the step wherein the system uses an algorithm to send the broadcast messages with a delay between each one. In this example, the example intrusion detection system will not detect the abnormal behavior, and the attempt is successful.

Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use.

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value, and the machine learning module is developed to maximize the numerical value of the reward signal. In addition, reinforcement learning can adopt a value function that provides a numerical value representing an expected total of the numerical values provided by the reward signal over time.

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pretrained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results.

Algorithms

Different machine-learning algorithms have been contemplated to carry out the embodiments discussed herein. For example, linear regression (LiR), Bayesian networks (for example, naive-bayes), neural networks (NN) (also known as artificial neural networks), a suitable statistical machine learning algorithm, and/or a heuristic machine learning system may be used.

Reinforcement Learning

In reinforcement learning, there are two approaches, either model based or model free. Model based are more in the planning area. Model-based approaches are used when the internal operation of the environment is known. It is known what next State and Reward will be output by the environment when some Action is performed from some Current State. Model free methods rely on the learning. They are used when the environment is very complex and its internal dynamics are not known. They treat the environment as a black-box. The approach contemplated in the present invention lies in the model free methods.

Model free algorithms are either value based or policy based. Value based algorithms finds the optimal policy indirectly through finding optimal state-action value. Examples of value based algorithms are SARSA, Qlearning, and deep Q learning. Current proposed approach uses Deep Q Learning (DQN).

Other policy based approaches can be considered. Policy based approach find the optimal policy directly. Policy gradient methods are very popular approach in this area. Examples of this approach include REINFORCE method and actor critic.

Policy gradient relies upon optimizing parametrized policies with respect to the expected return by gradient descent. In this approach the policy is represented by its function approximator and is updated based on the expected accumulated reward.

Actor-Critic

Actor-critic algorithm learns a policy function and a value function. The policy function objective is to make decisions, and the value function helps improve the training process. It is a TD (Temporal Difference) method that have a separate memory structure to explicitly represent the policy independent of the value function. The policy structure is known as the actor, because it is used to select actions, and the estimated value function is known as the critic, because it criticizes the actions made by the actor. Learning is always on-policy: the critic must learn about and critique whatever policy is currently being followed by the actor. The critique takes the form of a TD error.

Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be $y=mx+b$. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved.

Logistic Regression (LoR)

In one example embodiment, logistic regression machine learning is implemented. Logistic Regression, often considered a LiR type model, is typically used in machine learning to classify information. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process.

Random Forest

In one example embodiment, random forest may be implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding underperforming nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function.

Neural Networks

In one example embodiment, Neural Networks are implemented. NNs are a family of statistical learning models influenced by biological neural networks of the brain. NNs can be trained on a relatively large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN is defined by a set of input neurons that can be given input data. The input neuron weighs and transforms the input data and passes the result to other neurons, often referred to as "hidden" neurons. This is repeated until an output neuron is activated. The activated output neuron produces a result.

Convolutional Autoencoder n example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction.

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. See Sherstinsky, Alex. "Fundamentals of recurrent neural network (RNN)

and long short-term memory (LSTM) network." Physica D: Nonlinear Phenomena 404 (2020): 132306.

Long Short-Term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. See Zhu, Xiaodan, et al. "Long short-term memory over recursive structures." International Conference on Machine Learning. PMLR, 2015.

Convolutional Neural Network (CNN)

In an example embodiment, a convolutional neural network is implemented. CNNs is a class of NNs further attempting to replicate the biological neural networks, but of the animal visual cortex. CNNS process data with a grid pattern to learn spatial hierarchies of features. A typical CNN comprises of three layers: convolution, pooling, and fully connected. The convolution and pooling layers extract features, such as those described herein. The convolutional layer comprises of multiple mathematical operations such as of linear operations, a specialized type being a convolution. The fully connected layer combines the extracted features into an output. The input data may be represented in a grid, i.e., an array of numbers. A grid of parameters, called a kernel, operates as an optimizable feature extractor and is applied to each position in the grid. Extracted features may become hierarchically more complex as one layer feeds its output into the next layer.

See Yamashita, R., et al Convolutional neural networks: an overview and application in radiology. *Insights Imaging* 9, 611-629 (2018).

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features, and the second matrix Z contains the known output of the training input features. First the dot product of R and X are computed and the square mean error, as one example method, of the result is estimated. The values in R are modulated and the process is repeated in a gradient descent style approach until the error is appropriately minimized.

The trained matrix R is then used in the machine learning model. In example embodiments, ∅∅∅ are used to train the relationship matrix R in a matrix factorization machine learning module. After training, the relationship matrix R and input matrix F results in the prediction matrix P.

Hidden Markov Model

In example embodiments, a hidden Markov model is implemented. An HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. An HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically, the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of an SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the modules described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

Example Systems

GPU Computing

GPU computing is the use of a GPU (graphics processing unit) as a co-processor to accelerate CPUs for general-purpose scientific and engineering computing. GPUs started initially for video rendering and image processing. Then it became widely used in AI applications especially deep learning. GPUS has hundreds and thousands of cores that can help process many bits of data at the same time. GPUs can accelerate matrix multiplication processes, which is the core process of deep learning.

Now there are GPUs that are designed and built specifically for AI and deep learning solutions. Training a deep learning model with thousands of trainable parameters can now take hours instead of days and weeks with the help GPU servers. With the advancements in AI and Deep learning and the complexity of the new developed architectures, GPUs are becoming a mandatory part of the AI systems not optional.

Quantum Computing

Quantum computing is a type of computation whose operations are inspired from quantum mechanics, such as superposition, interference, and entanglement. Devices that perform quantum computations are known as quantum computers. In quantum Computing "qubits" are used instead of "bits," which are used by classical computers. The term "qubit" stands for Quantum Binary Digit. While bits have only two states·0 and 1-qubits can have multiple states at the same time. The value ranges between 0 and 1.

Quantum machine learning is the use of quantum computing techniques within machine learning algorithms. The main goal of Quantum Machine Learning is to accelerate the processing of machine learning programs by applying what we know from quantum computing. Now, Quantum machine learning can solve linear algebraic problems, principal component analysis, support vector machines, optimization and deep learning and others.

FIG. 6 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general pur-
pose processor, a processor core, a multiprocessor, a recon-
figurable processor, a microcontroller, a digital signal pro-
cessor (DSP), an application specific integrated circuit
(ASIC), a graphics processing unit (GPU), a field program-
mable gate array (FPGA), a programmable logic device
(PLD), a controller, a state machine, gated logic, discrete
hardware components, any other processing unit, or any
combination or multiplicity thereof. The processor 2010
may be a single processing unit, multiple processing units,
a single processing core, multiple processing cores, special
purpose processing cores, co-processors, or any combina-
tion thereof. According to certain examples, the processor
2010 along with other components of the computing
machine 2000 may be a virtualized computing machine
executing within one or more other computing machines.

The system memory 2030 may include non-volatile
memories, for example, read-only memory (ROM), pro-
grammable read-only memory (PROM), erasable program-
mable read-only memory (EPROM), flash memory, or any
other device capable of storing program instructions or data
with or without applied power. The system memory 2030
may also include volatile memories, for example, random
access memory (RAM), static random access memory
(SRAM), dynamic random access memory (DRAM), and
synchronous dynamic random access memory (SDRAM).
Other types of RAM also may be used to implement the
system memory 2030. The system memory 2030 may be
implemented using a single memory module or multiple
memory modules. While the system memory 2030 is
depicted as being part of the computing machine 2000, one
skilled in the art will recognize that the system memory 2030
may be separate from the computing machine 2000 without
departing from the scope of the subject technology. It should
also be appreciated that the system memory 2030 may
include, or operate in conjunction with, a non-volatile stor-
age device, for example, the storage media 2040.

The storage media 2040 may include a hard disk, a floppy
disk, a compact disc read only memory (CD-ROM), a digital
versatile disc (DVD), a Blu-ray disc, a magnetic tape, a flash
memory, other non-volatile memory device, a solid state
drive (SSD), any magnetic storage device, any optical
storage device, any electrical storage device, any semicon-
ductor storage device, any physical-based storage device,
any other data storage device, or any combination or mul-
tiplicity thereof. The storage media 2040 may store one or
more operating systems, application programs and program
modules, for example, module 2050, data, or any other
information. The storage media 2040 may be part of, or
connected to, the computing machine 2000. The storage
media 2040 may also be part of one or more other computing
machines that are in communication with the computing
machine 2000, for example, servers, database servers, cloud
storage, network attached storage, and so forth.

The module 2050 may comprise one or more hardware or
software elements configured to facilitate the computing
machine 2000 with performing the various methods and
processing functions presented herein. The module 2050
may include one or more sequences of instructions stored as
software or firmware in association with the system memory
2030, the storage media 2040, or both. The storage media
2040 may therefore represent examples of machine or
computer readable media on which instructions or code may
be stored for execution by the processor 2010. Machine or
computer readable media may generally refer to any
medium or media used to provide instructions to the pro-
cessor 2010. Such machine or computer readable media associated with the module 2050 may comprise a computer
software product. It should be appreciated that a computer
software product comprising the module 2050 may also be
associated with one or more processes or methods for
delivering the module 2050 to the computing machine 2000
via the network 2080, any signal-bearing medium, or any
other communication or delivery technology. The module
2050 may also comprise hardware circuits or information for
configuring hardware circuits, for example, microcode or
configuration information for an FPGA or other PLD.

The input/output (I/O) interface 2060 may be configured
to couple to one or more external devices, to receive data
from the one or more external devices, and to send data to
the one or more external devices. Such external devices
along with the various internal devices may also be known
as peripheral devices. The I/O interface 2060 may include
both electrical and physical connections for operably cou-
pling the various peripheral devices to the computing
machine 2000 or the processor 2010. The I/O interface 2060
may be configured to communicate data, addresses, and
control signals between the peripheral devices, the comput-
ing machine 2000, or the processor 2010. The I/O interface
2060 may be configured to implement any standard inter-
face, for example, small computer system interface (SCSI),
serial-attached SCSI (SAS), fiber channel, peripheral com-
ponent interconnect (PCI), PCI express (PCIe), serial bus,
parallel bus, advanced technology attached (ATA), serial
ATA (SATA), universal serial bus (USB), Thunderbolt, Fire-
Wire, various video buses, and the like. The I/O interface
2060 may be configured to implement only one interface or
bus technology. Alternatively, the I/O interface 2060 may be
configured to implement multiple interfaces or bus technolo-
gies. The I/O interface 2060 may be configured as part of, all
of, or to operate in conjunction with, the system bus 2020.
The I/O interface 2060 may include one or more buffers for
buffering transmissions between one or more external
devices, internal devices, the computing machine 2000, or
the processor 2010.

The I/O interface 2060 may couple the computing
machine 2000 to various input devices including mice,
touch-screens, scanners, electronic digitizers, sensors,
receivers, touchpads, trackballs, cameras, microphones,
keyboards, any other pointing devices, or any combinations
thereof. The I/O interface 2060 may couple the computing
machine 2000 to various output devices including video
displays, speakers, printers, projectors, tactile feedback
devices, automation control, robotic components, actuators,
motors, fans, solenoids, valves, pumps, transmitters, signal
emitters, lights, and so forth.

The computing machine 2000 may operate in a networked
environment using logical connections through the network
interface 2070 to one or more other systems or computing
machines across the network 2080. The network 2080 may
include wide area networks (WAN), local area networks
(LAN), intranets, the Internet, wireless access networks,
wired networks, mobile networks, telephone networks, opti-
cal networks, or combinations thereof. The network 2080
may be packet switched, circuit switched, or any topology,
and may use any communication protocol. Communication
links within the network 2080 may involve various digital or
analog communication media, for example, fiber optic
cables, free-space optics, waveguides, electrical conductors,
wireless links, antennas, radio-frequency communications,
and so forth.

The processor 2010 may be connected to the other ele-
ments of the computing machine 2000 or the various periph-
erals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system to provide connections to use artificial intelligence to secure a network system, comprising:
   a processor of a service provider communicatively coupled to a storage device, wherein the processor executes application code instructions that are stored in the storage device to cause the system to:
   identify data associated with a network system;
   use artificial intelligence to analyze the data to identify recommended security assessments;
   use artificial intelligence with a deep reinforcement learning model to automatically to define a state space and an action space corresponding to network assets, vulnerabilities, and exploitation actions, and to automatically identify and evaluate multi-step vulnerability exploitation paths across multiple assets in the network system by maximizing an accumulative reward associated with exploitation outcomes;
   use artificial intelligence to rank the vulnerabilities based on the identified multi-step vulnerability exploitation paths;
   use artificial intelligence to predict a next asset likely to be attacked based on the identified multi-step vulnerability exploitation paths and the ranked vulnerabilities; and
   use artificial intelligence to suggest security actions based on the ranked vulnerabilities.

2. The system of claim 1, further comprising application code instructions to cause the system to display a graphical user interface representing a security status for one or more nodes of the network system.

3. The system of claim 2, wherein the graphical user interface indicates the security status for each of the one or more nodes of the network system based on a color.

4. The system of claim 1, wherein using artificial intelligence to rank the vulnerabilities further comprises using deep learning or machine learning algorithms to predict a risk score for each vulnerability and to rank each vulnerability.

5. The system of claim 1, wherein using artificial intelligence to predict a next asset that is most likely to be attacked is performed based on a deep reinforcement learning algorithm.

6. The system of claim 1, further comprising application code instructions to cause the system to use artificial intelligence to recommend appropriate countermeasures for one or more of the ranked vulnerabilities.

7. The system of claim 1, further comprising application code instructions to cause the system to build a unified ontology from different available security ontologies to be a formal knowledge representation of the network system and of communication between different artificial intelligence and security modules of the processor.

8. The system of claim 1, wherein using artificial intelligence to rank the vulnerabilities further comprises identifying false positives based on vulnerabilities that are not identified in any ranked vulnerability exploitation path.

9. The system of claim 1, further comprising using artificial intelligence to suggest security actions based on the ranked vulnerabilities.

10. A method to use artificial intelligence to secure a network system, comprising:
   identifying, by one or more computing devices, data associated with a network system;

using, by the one or more computing devices, artificial intelligence to analyze the data to identify recommended security assessments;

using, by the one or more computing devices, artificial intelligence with a deep reinforcement learning model to define a state space and an action space corresponding to network assets, vulnerabilities, and exploitation actions, and to automatically identify and evaluate multi-step vulnerability exploitation paths across multiple assets in the network system by maximizing an accumulative reward associated with exploitation outcomes;

using, by the one or more computing devices, artificial intelligence to rank the vulnerabilities based on the identified multi-step vulnerability exploitation paths;

using, by the one or more computing devices, artificial intelligence to predict a next asset likely to be attacked based on based on the identified multi-step vulnerability exploitation paths and the ranked vulnerabilities; and using, by the one or more computing devices, artificial intelligence to suggest security actions based on the ranked vulnerabilities.

11. The method of claim 10, further comprising displaying a graphical user interface representing a security status for one or more nodes of the network system.

12. The method of claim 11, wherein the graphical user interface indicates the security status for each of the one or more nodes of the network system based on a color.

13. The method of claim 10, wherein using artificial intelligence to rank the vulnerabilities further comprises using deep learning or machine learning algorithms to predict a risk score for each vulnerability and to rank each vulnerability.

14. A computer program product, comprising:

a non-transitory computer-readable medium having computer-readable program instructions embodied thereon, the computer-readable program instructions comprising computer-readable program instructions to:

identify data associated with a network system;

use artificial intelligence to analyze the data to identify recommended security assessments;

use artificial intelligence to analyze the data to identify recommended security assessments;

use artificial intelligence with a deep reinforcement learning model to define a state space and an action space corresponding to network assets, vulnerabilities, and exploitation actions, and to identify and evaluate multi-step vulnerability exploitation paths across multiple assets in the network system by maximizing an accumulative reward associated with exploitation outcomes;

use artificial intelligence to rank the vulnerabilities based on the identified multi-step vulnerability exploitation paths;

use artificial intelligence to predict a next asset likely to be attacked based on the identified multi-step vulnerability exploitation paths and the ranked vulnerabilities; and use artificial intelligence to suggest security actions based on the ranked vulnerabilities.

\* \* \* \* \*